United States Patent
Thorn et al.

(10) Patent No.: US 9,854,139 B2
(45) Date of Patent: Dec. 26, 2017

(54) LIFELOG CAMERA AND METHOD OF CONTROLLING SAME USING VOICE TRIGGERS

(71) Applicant: Sony Corporation, Tokyo (JP)

(72) Inventors: Ola Thorn, Limhamn (SE); Henrik Bengtsson, Lund (SE); Jonas Gustavsson, Lund (SE); Linus Martensson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 341 days.

(21) Appl. No.: 14/313,078

(22) Filed: Jun. 24, 2014

(65) Prior Publication Data

US 2015/0373236 A1    Dec. 24, 2015

(51) Int. Cl.
*H04N 7/18* (2006.01)
*H04N 5/225* (2006.01)
*H04N 5/232* (2006.01)
*H04N 5/77* (2006.01)

(52) U.S. Cl.
CPC ........... *H04N 5/2251* (2013.01); *H04N 5/232* (2013.01); *H04N 5/23216* (2013.01); *H04N 5/772* (2013.01); *H04N 7/185* (2013.01)

(58) Field of Classification Search
CPC .................................................. H04N 5/2251
See application file for complete search history.

(56) References Cited

U.S. PATENT DOCUMENTS

| | | | |
|---|---|---|---|
| 6,061,646 A | 5/2000 | Martino et al. | |
| 7,222,075 B2 | 5/2007 | Petrushin | |
| 7,940,914 B2 | 5/2011 | Petrushin | |
| 2008/0298796 A1 | 12/2008 | Kuberka et al. | |
| 2010/0199232 A1* | 8/2010 | Mistry | G06F 1/163 715/863 |
| 2012/0229632 A1* | 9/2012 | Hoertenhuber | B23K 9/0956 348/143 |
| 2013/0007137 A1 | 1/2013 | Azzam et al. | |
| 2013/0030789 A1 | 1/2013 | Dalce | |
| 2013/0124207 A1* | 5/2013 | Sarin | G10L 15/22 704/275 |
| 2013/0215266 A1* | 8/2013 | Trundle | G08B 13/19602 348/143 |
| 2014/0204245 A1* | 7/2014 | Wexler | H04N 5/23222 348/231.99 |
| 2015/0223110 A1* | 8/2015 | Lindner | H04L 65/4061 455/518 |

FOREIGN PATENT DOCUMENTS

| | | |
|---|---|---|
| EP | 1 571 634 A1 | 9/2005 |
| EP | 1 920 715 A2 | 5/2008 |
| EP | 2 494 546 B1 | 12/2013 |

OTHER PUBLICATIONS

International Search Report and Written Opinion dated Sep. 7, 2015 for corresponding International Application No. PCT/IB2015/053171.

* cited by examiner

*Primary Examiner* — Tracy Y Li
(74) *Attorney, Agent, or Firm* — Renner, Otto, Boisselle & Sklar, LLP

(57) ABSTRACT

A lifelog camera is configured to capture the digital image without user input upon detection of a sound-based trigger in an audio signal output by a microphone present at the lifelog camera. The sound-based trigger is indicative of activity of the user or another person near the user.

20 Claims, 1 Drawing Sheet

LIFELOG CAMERA AND METHOD OF CONTROLLING SAME USING VOICE TRIGGERS

TECHNICAL FIELD OF THE INVENTION

The technology of the present disclosure relates generally to lifelog cameras and, more particularly, to a lifelog camera that is controlled to take photos in response to voice triggers.

BACKGROUND

A lifelog camera is a camera device that is typically worn by a user and used to capture photos that serve a photographic memory of events occurring near the user. Conventional lifelog cameras are configured to capture images on a timed basis. In some devices, for example, an image is captured every 30 seconds. If left to take pictures over the course of several hours or an entire day, the lifelog camera could take hundreds or thousands of pictures at the predetermined time intervals. Under this approach, many of the images captured by conventional lifelog cameras are not very interesting. Therefore, a lifelog camera's memory may become filled with photos that are not of interest to the user. More compelling moments may occur rather quickly and between the timed increments for taking a photo. However, it is difficult to determine when those compelling moments are occurring.

One proposed way to increase the appeal of stored images is to evaluate the photos for visual content that is worth retaining, such as images containing people or certain types of objects. The rest of the images may be deleted. An issue with this approach is that the approach is processor intensive and consumes power that reduces battery life.

Another proposed technique is to synchronize the taking of photos to the location of the device, such as locations predetermined to have interest or locations to which the user has not travelled before. But this makes assumptions about locations that may not lead to an interesting depiction of the user's life events. That is, in this approach, the resulting images may not fully "tell" the user's story. Also, some new locations (e.g., a parking lot) may be rather mundane.

Another approach is to reduce the time interval between capturing photos, but this leads to capturing too much data and at the wrong occasions. Taking large numbers of uninteresting photos may be annoying to the user, and consumes battery life and data storage space.

SUMMARY

The disclosed techniques for controlling operation of a lifelog camera include detecting a voice event as a trigger for taking one or more photos. Detecting voice triggers serves as a proxy for identifying moments that may contain interesting subject matter for a photo. As the subject matter of photos increases in interest, the favorability of the user experience with the lifelog camera product also will increase. Therefore, the disclosed techniques are designed to attempt to capture images with interesting subject matter, or at least a higher percentage of interesting images than if only a time-based approach were used.

According to one aspect of the disclosure, a method of capturing and storing a digital image with a lifelog camera that is configured to capture the digital image without user input that commands the capturing of the digital image includes detecting a sound-based trigger in an audio signal output by a microphone present at the lifelog camera, the sound-based trigger indicative of activity of the user or another person near the user; capturing the digital image with a camera module of the lifelog camera, the capturing triggered by the detection of the sound-based trigger; and storing the digital image in a memory.

According to one embodiment of the method, the sound-based trigger includes a voice of a person.

According to one embodiment of the method, the sound-based trigger includes detection of a speaker after a predetermined period of time without speaking.

According to one embodiment of the method, the sound-based trigger includes detection of a new speaker when a conversation is already in progress.

According to one embodiment of the method, the sound-based trigger includes detection of a change in a characteristic of the voice.

According to one embodiment of the method, the characteristic of the voice is at least one of pitch, tone, intonation, volume, speaking pace, word selection, language structure, language, expression of emotion, mood, or topic discussed.

According to one embodiment of the method, the sound-based trigger includes detection of a name or a greeting.

According to one embodiment of the method, the sound-based trigger includes a person-generated sound.

According to one embodiment of the method, the sound-based trigger includes at least one of a laugh, applause, a gasp, a cheer, or singing.

According to another aspect of the disclosure, a lifelog camera that is configured to capture a digital image without user input that commands the capturing of the digital image includes a control circuit configured to detect a sound-based trigger in an audio signal output by a microphone present at the lifelog camera, the sound-based trigger indicative of activity of the user or another person near the user; a camera module that captures the digital image under the control of the control circuit in response to the detection of the sound-based trigger; and a memory in which the digital image is stored.

According to one embodiment of the lifelog camera, the sound-based trigger includes a voice of a person.

According to one embodiment of the lifelog camera, the sound-based trigger includes one of detection of a speaker after a predetermined period of time without speaking or detection of a new speaker when a conversation is already in progress.

According to one embodiment of the lifelog camera, the sound-based trigger includes detection of a change in a characteristic of the voice.

According to one embodiment of the lifelog camera, the characteristic of the voice is at least one of pitch, tone, intonation, volume, speaking pace, word selection, language structure, language, expression of emotion, mood, or topic discussed.

According to one embodiment of the lifelog camera, the sound-based trigger includes detection of a name or a greeting.

According to one embodiment of the lifelog camera, the sound-based trigger includes a person-generated sound in the form of at least one of a laugh, applause, a gasp, a cheer, or singing.

According to one embodiment of the lifelog camera, the lifelog camera further comprises the microphone.

According to one embodiment of the lifelog camera, the lifelog camera further comprises an interface with another electronic device separate from the lifelog camera and the microphone is part of the another electronic device.

According to another aspect of the disclosure, a method of capturing and storing a digital image with a lifelog camera that is configured to capture the digital image without user input that commands the capturing of the digital image includes capturing the digital image with a camera module of the lifelog camera, the capturing triggered by a time schedule for capturing images; analyzing an audio signal output by a microphone present at the lifelog camera for a sound-based trigger indicative of activity of the user or another person near the user and occurring within a predetermined amount of time before or within a predetermined amount of time after the capturing of the digital image; and storing the digital image in an image store of a memory for later displaying or transfer to an electronic device separate from the lifelog camera if detection of the sound-based trigger is made, else not retaining the digital image in the lifelog camera for later displaying or transfer to an electronic device separate from the lifelog camera.

DETAILED DESCRIPTION OF EMBODIMENTS

Figure 1:
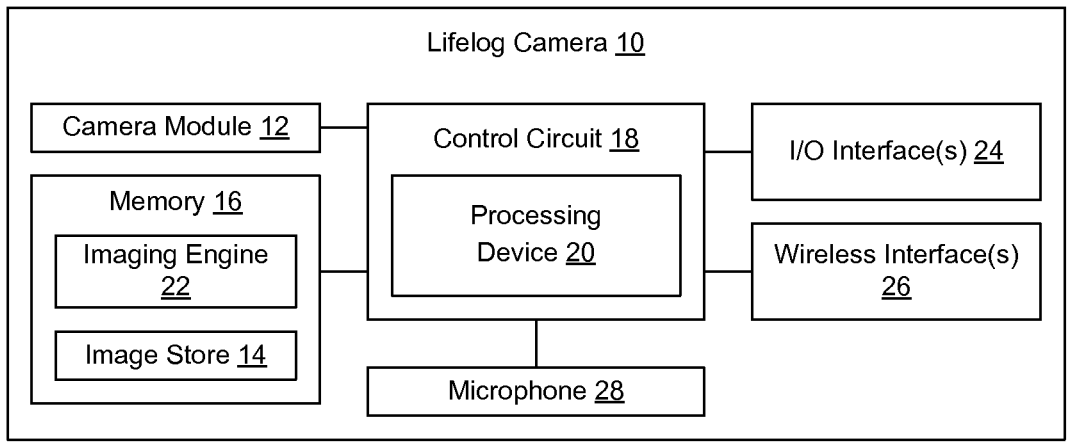
FIG. 1 is a schematic block diagram of a lifelog camera that employs voice events as triggers for taking one or more photos.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling the electronic device to take photographs. The electronic device is typically—but not necessarily—a dedicated lifelog camera. In other embodiments, the electronic device may be some other portable electronic device such as, but not limited to, a mobile telephone, a tablet computing device, a gaming device, a digital point-and-shoot camera, or a media player.

With initial reference to FIG. 1, illustrated is a schematic block diagram of an exemplary electronic device configured as a lifelog camera 10. The lifelog camera 10 may pin or clip to an article of clothing that is worn by the user. In other arrangements, the lifelog camera 10 is configured as a bracelet or wristband, a ring, a headband, eyeglasses, an article of clothing, a piercing, etc.

The lifelog camera 10 includes a camera module 12. The camera module 12 includes appropriate optics and a sensor for imaging a scene to generate still images and, in some cases, video. Images and video captured by the camera module 12 may be stored in an image store 14 of a memory 16.

The lifelog camera 10 includes a control circuit 18 that is responsible for overall operation of the lifelog camera 10, including controlling when to capture images with the camera module 12. In one embodiment, the control circuit 18 includes a processor 20 that executes operating instructions. In one embodiment, control over whether to capture and store an image is embodied as part of an imaging engine 22 that is also stored in memory 16.

The imaging engine 22 may be embodied in the form of an executable logic routine (e.g., lines of code, a software program, firmware, etc.) that is stored on a non-transitory computer readable medium (e.g., the memory 16) of the lifelog camera 10 and that is executed by the control circuit 18. The described operations may be thought of as a method that is carried out by the lifelog camera 10.

The processor 20 of the control circuit 18 may be a central processing unit (CPU), a microcontroller, or a microprocessor that executes code in order to carry out operation of the lifelog camera 10. The memory 16 may be, for example, one or more of a buffer, a flash memory, a hard drive, a removable media, a volatile memory, a non-volatile memory, a random access memory (RAM), or other suitable device. In a typical arrangement, the memory 16 includes a non-volatile memory for long term data storage and a volatile memory that functions as system memory for the control circuit 18. The memory 16 may exchange data with the control circuit 18 over a data bus. Accompanying control lines and an address bus between the memory 16 and the control circuit 18 also may be present. The memory 16 is considered a non-transitory computer readable medium.

The lifelog camera 10 may include interfaces for establishing communication with another device, such as a computer, a mobile phone, a wireless router for establishing Internet access, etc. An exemplary interface is an input/output (I/O) interface 24 in the form of an electrical connector and interface circuitry for establishing connectivity to another device using a cable. A typical I/O interface 24 is a USB port. Operating power and/or power to charge a battery (not shown) of the lifelog camera 10 may be received over the I/O interface 24. The battery may supply power to operate the lifelog camera 10 in the absence of an external power source. Another exemplary interface is a wireless interface 26. The wireless interface 26 may be, for example, an interface 26 that operates in accordance with Bluetooth standards, WiFi standards, or another wireless standard. Another wireless interface 26 may be an intrapersonal area network, such as a body area network (BAN). Multiple wireless interfaces 26 may be present to operate over multiple standards (e.g., two or more of a BAN, Bluetooth and WiFi).

The lifelog camera 10 may include a display for displaying captured images and for assisting the user in adjusting settings. However, it is contemplated that the lifelog camera 10 will not include a display and images are viewed using a connected device or after transferring the images from the lifelog camera to another device.

In one embodiment, a microphone 28 is present to capture audio. The captured sounds may serve as an audio component for video that is captured with the lifelog camera 10. As will be described, the lifelog camera 10 may monitor an audio signal output by the microphone 28 for voice events (also referred to as voice triggers) that, if detected, are used to activate the camera module 12 to capture a photo. In some embodiments, the triggering voice event causes the capture of more than photo or causes the capture of video. The imaging engine 22, as executed by the processor 20, may have responsibility for monitoring the audio signal output by the microphone 28.

In the illustrated embodiment, the microphone 28 is part of the lifelog camera 10 and the monitoring for voice triggers is carried out by the lifelog camera 10. In another embodiment, the microphone that outputs the audio signal that is monitored for voice triggers is part of another device, such as a mobile telephone that is carried by the user of the lifelog camera 10. In this embodiment, the audio signal is communicated to the lifelog camera 10 for processing, such as over the wireless interface 26. In still another embodiment, the microphone that outputs the audio signal that is monitored for voice triggers is part of another device, such as a mobile telephone, and the other device also processes the audio signal to detect voice triggers. If a voice trigger is detected by the other device, a command to capture a photo or a message indicating the detection of a voice trigger is communicated to the lifelog camera 10, such as over the wireless interface 26.

Although not illustrated, the lifelog camera 10 may include or receive signals from other sensors that generate respective outputs that also may play a role in image capture. Exemplary sensors include, but are not limited to, an accelerometer or other motion sensor, a global positioning system (GPS) receiver, an electric field sensor, a magnetometer, a compass, a biometric sensor (e.g., one or more of a galvanic skin response (GSR) sensor, a pulse rate monitor, a pupil dilation and/or eye movement sensor, a brain wave activity sensor, a blood pressure sensor, a body temperature sensor, a muscle contraction sensor, etc.).

Figure 2:
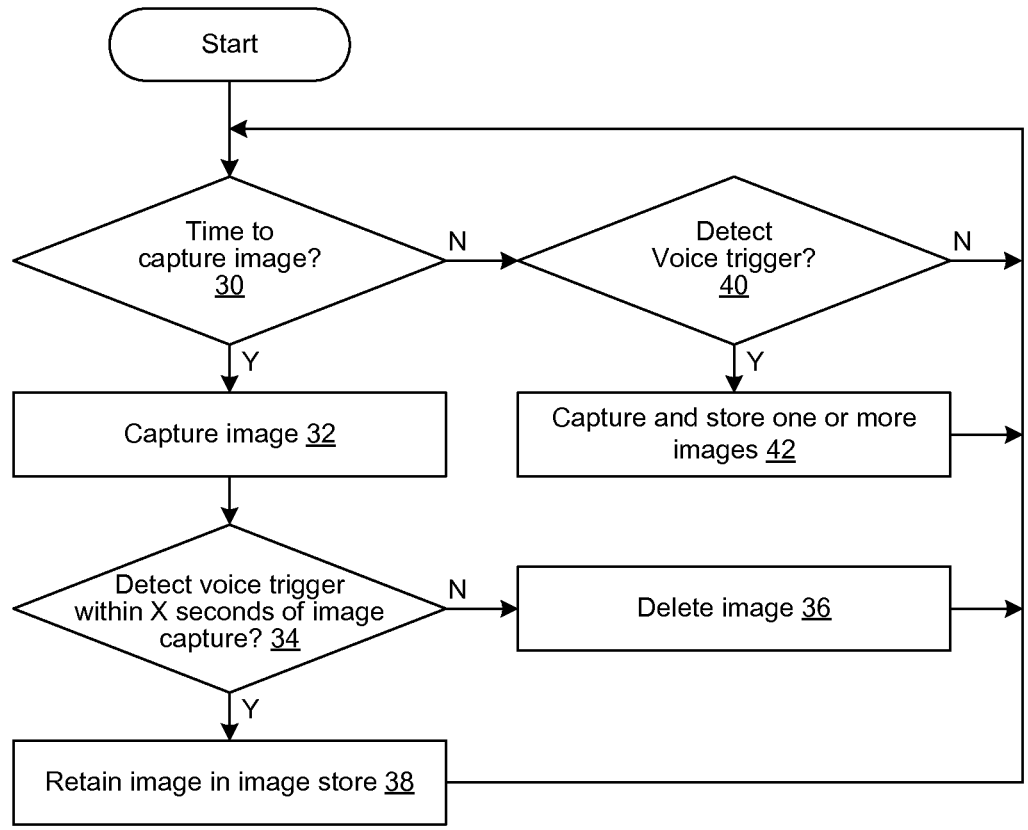
FIG. 2 is a flow diagram of camera control functions carried out by the lifelog.

With additional reference to FIG. 2, illustrated is a flow diagram representing steps that may be carried out by the lifelog camera 10 to control the capturing and storing of images. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 30. In block 30, a determination may be made as to whether a time-based image should be captured. In one embodiment, the lifelog camera 10 may be configured to capture images at predetermined intervals (e.g., once every 20 seconds or once every 30 seconds) even if the lifelog camera 10 is also configured to capture images based on other criteria. The capturing of images based on time may be turned on or off by the user. Therefore, the determination in block 30 may include determining if a timed image capture function is turned on and, if so, determine if a predetermined time interval between image captures has elapsed to implement a time-based schedule for capturing images.

If a positive determination is made in block 30, the logical flow may proceed to block 32. In block 32, an image is captured using the camera module 12 and a corresponding digital photograph is buffered. The images that are captured in block 32 are taken automatically and without user involvement to command the taking of the images (e.g., without user input such as touching a shutter button).

Following block 32, a determination may be made in block 34 as to whether a voice trigger is detected within a predetermined amount of time from the capturing of the image in block 32. The predetermined amount of time may be any amount of time shorter than the interval of time between successive image captures as determined in block 30. Also, the voice trigger that results in a positive determination in block 34 may be before or after the capturing of the image in block 32. The predetermined amount of time for voice triggers before the image capture need not be the same as the predetermined amount of time for voice triggers after the image capture. Exemplary predetermined times are about five seconds before the image capture in block 32 and about 15 seconds after the image capture in block 32. Another exemplary set of predetermined times are about two seconds before the image capture in block 32 and about 5 seconds after the image capture in block 32. It will be appreciated that other predetermined times may be employed.

If a voice trigger is not detected in the predetermined amount of time before or after a timed image capture, then the logical flow may proceed to block 36. In block 36, the image is not retained (e.g., deleted from memory 16). Alternatively, if a voice trigger is detected in the predetermined amount of time before or after a timed image capture, then the logical flow may proceed to block 38. In block 38, the image is retained in the image store 14 for subsequent transfer to another device and/or viewing. Following the appropriate one of block 36 or block 38, the logical flow may return to block 30.

As will be discussed in connection with block 40, the lifelog camera 10 may be configured to detect voice triggers that include voice events that indicate activity by the user or another person. It is contemplated that capturing and/or retaining photos from these moments will result in a collection of images that are more interesting than images taken on a periodic basis without regard to activity of the user or persons near the user.

In one embodiment, additional post-processing may be carried out on images identified for storage in block 38. For instance, image analysis may be carried out to search for interesting characteristics, such as objects or persons in the image. If the image is determined to have interesting characteristics it may be retained and, if the image does not contain interesting characteristics, the image may be deleted. Other post-processing may include determining if the image is redundant of an earlier stored image by comparing characteristics of the images. If the image is determined to be redundant, the image may be deleted and, if the image is not redundant, the image may be retained. In one embodiment, two images of an individual, but with different facial expressions or in different settings, are not considered redundant.

If a negative determination is made in block 30, the logical flow may proceed to block 40. In block 40, a determination is made as to whether the monitored audio signal (e.g., the output from the microphone 28) contains a voice trigger. If so, the logical progression proceeds to block 42 where an image is captured and stored. The images that are captured in block 42 are taken automatically and without user involvement to command the taking of the image (e.g., without user input such as touching a shutter button). Following block 42 or following a negative determination in block 40, the logical flow may return to block 30.

In one implementing embodiment of the method represented by the flow diagram of FIG. 2, the lifelog camera 10 continuously monitors for a voice trigger. If a voice trigger is detected, then at least one image or video is captured with the camera module 12 and stored in memory 16.

In one embodiment, more than one image is captured in block 42. For instance two, three, four or five images may be captured at intervals of a half second, one second, or two seconds. This may increase the chance of capturing one or more photos of interest (e.g., such as a photo containing an image of a speaker or a person the user is speaking to). In other situations, the lifelog camera 10 may capture video in response the detection of a voice trigger in block 40. Video may be captured for a predetermined amount of time, such as five seconds or ten seconds. The number of images to capture or the determination to capture video instead of or in addition to capturing one or more images may be based on the type of voice trigger that is detected and/or intensity of the detected voice trigger (e.g., a speaker determined to be annoyed versus very angry or a speaker speaking in a whisper or elevated volume versus a normal volume).

Various types of voice triggers will now be discussed. The voice triggers may be applied to any speaker within range of the microphone 28, including the user or another individual. The other individual need not direct his or her speech to the user. Filters may be employed to ignore speech audio from a television or radio, which may include electronic coordination between the lifelog camera 10 and another electronic device to distinguish speakers associated with the television or radio from speakers that are in the presence of the lifelog camera 10.

One voice trigger is the detection of a speaker when there had been no speaking for a predetermined period of time (e.g., 30 seconds or one minute). For example, if the user is working silently at a computer and another person speaks to call the user's attention, a voice trigger may be detected by the sound of the other person's voice. In one embodiment, continued conversation, such as the user speaking during a telephone call or with another co-located person, will not result in detection of a voice trigger. Also, relatively quiet speech, such as background conversations, will not result in detection of a voice trigger.

Another voice trigger is the detection of a new speaker when a conversation is already in progress (e.g., when a third person joins an existing conversation between two persons). For this purpose, the voice characteristics of speakers may be tracked to determine if a new speaker speaks or if words are from an existing party to a conversation. Also, voice recognition and/or speech recognition may be used for this purpose.

Another voice trigger is the detection of a change in one or more characteristics of a speaker's voice. The imaging engine 22 may be configured to detect a change in the one or more characteristics of the speaker's voice while the speaker is speaking. Also, in the case where the speaker is conversing with one or more other persons, the imaging engine 22 may be configured to detect a change in the one or more characteristics of the speaker's voice during the conversation. For example, during a conversation, the speaker will have successive statements that are interleaved with the statements from one or more other speakers. If the current statement of the speaker changes in characteristics from an immediately prior statement (or other earlier prior statement) of the same speaker during the exchange of statements forming the conversation, then a voice trigger may be detected.

Exemplary characteristics that may be monitored for a change include, but are not limited to, pitch, tone, intonation, volume, speaking pace (e.g., speaking pace defined to include rate of word generation and the length of pauses during speech), word selection and/or language structure (e.g., the types of words that are used such as common conversational words, slang or informal words or language structure, formal words or language structure, curse words, etc.), mood, expression of emotion (e.g., sadness, happiness, excitement, tenderness, love, fear, anger, etc.), language or dialect that is spoken, and topic discussed.

Monitoring some of these characteristics, such as word selection and/or language structure, certain expressions of emotion, language or dialect that is spoken and topic discussed, may include speech recognition to convert the speaker's voice to text. The text may be compared to a language and syntax database with predetermined classifications for different words and phrases, language structures and so forth. Exemplary techniques for detecting the language spoken by a person and/or the dialect spoken by a user may be found in U.S. Pat. No. 6,061,646, U.S. Patent Application Publication No. 2013/0030789, and European Patent No. 2 494 546, although other techniques as described in various other sources may be employed. Exemplary techniques for detecting a topic of conversation may be found in U.S. Patent Application Publication No. 2013/0007137, although other techniques as described in various other sources may be employed.

Monitoring mood may be accomplished using known techniques for detecting emotions as manifested in speech or voice characteristics. This may include monitoring a combination of characteristics (e.g., pitch, tone, intonation, volume, word selection, etc.) found in the user's speech relative to a normal (or "baseline") speaking voice of the speaker. Moods may include, for example, happy, sad, angry and so forth, which are each distinguishable from the speaker's baseline speaking voice. In one embodiment, different moods for a recognized speaker are classified based on voice characteristics (e.g., pitch, tone, intonation, volume, word selection, word selection and/or language structure, etc.). The classifications are stored (e.g., in memory 16) and used to compare against currently detected speech to determine if a change in mood occurs. More detailed descriptions of exemplary techniques for detecting emotion in voice signals may be found in U.S. Pat. Nos. 7,940,914 and 7,222,075, although other techniques as described in various other sources may be employed.

In one implementing embodiment, the imaging engine 22 may include a transition detection module for each monitored characteristic. The transition detection modules are configured to detect corresponding state transitions in the monitored audio signal and, if a state transition is detected, then the positive determination may be made in block 40.

Another voice trigger may be the detection of person-generated sound that is not necessarily speech, such as a laugh, applause (e.g., clapping), a gasp, a cheer, singing, and so forth. Another voice trigger may be specific words or phrases. For instance, a greeting word (e.g., "hello" or "hi" in English, or "hej" in Swedish) may trigger the taking a photo since these words are commonly spoken when encountering another person. Other exemplary words or phrases that may be used as a voice trigger include user-defined words (e.g., a command word for the lifelog camera 10 to capture an image), a person's name, the phrase "good morning", etc.

In yet another embodiment, sound triggers in addition to voice triggers may be used to prompt taking of a photo. Sound triggers may be sounds that are not generated by a person and that typically happen on an infrequent basis. These non-vocal, sound triggers may include for example, a fire alarm, a car crash, a revving motor, an abrupt and loud noise (e.g., a "bang"), a dog bark, or some other sound.

In one embodiment, additional post-processing may be carried out on images captured in block 42. For instance, image analysis may be carried out to search for interesting characteristics, such as objects or persons in the image. If the image is determined to have interesting characteristics it may be retained and, if the image does not contain interesting characteristics, the image may be deleted. In this manner, photos captured as a result of detection of a voice trigger, but not containing a speaker or other interesting characteristic, will not appear in the image store. This may be advantageous in certain circumstances, such as when the user is watching television or when one person that is not in the field of view of the camera module 12 calls to the user (e.g., the user's spouse calling to the user while the user is working on a computer and not in direct presence of the spouse). In these exemplary situations, the absence of a person in the image will result in the deletion of the image. Persons appearing on a display or television that is captured in the image may be ignored by identifying image characteristics of the display or television surrounding the person.

Other post-processing may include determining if the image is redundant of an earlier stored image by comparing characteristics of the images. If the image is determined to be redundant, the image may be deleted and, if the image is not redundant, the image may be retained. In one embodiment, two images of an individual, but with different facial expressions or in different settings, are not considered redundant.

Although certain embodiments have been shown and described, it is understood that equivalents and modifications falling within the scope of the appended claims will occur to others who are skilled in the art upon the reading and understanding of this specification.

What is claimed is:

1. A method of capturing and storing digital image data, the digital image data including at least one of a digital image or a video, the method comprising:
   using a camera configured to capture the digital image data without user input that commands the capturing of the digital image data,
   detecting a sound-based trigger in an audio signal output by a microphone present at the camera, the sound-based trigger indicative of activity of the user or another person near the user;
   determining at least one of a type of the sound-based trigger or an intensity of the sound-based trigger;
   capturing the digital image data with a camera module of the camera, the capturing triggered by the detection of the sound-based trigger, wherein prior to capturing the digital image data a number of images to be captured or a determination to capture video instead of or in addition to the capture of one or more images is based on at least one of the determined type of the detected sound-based trigger or the determined intensity of the detected sound-based trigger; and
   storing the digital image data in a memory.

2. The method claim 1, wherein the sound-based trigger includes a voice of a person.

3. The method of claim 2, wherein the sound-based trigger includes detection of a speaker after a predetermined period of time without speaking.

4. The method of claim 2, wherein the sound-based trigger includes detection of a new speaker when a conversation is already in progress.

5. The method of claim 2, wherein the sound-based trigger includes detection of a change in a characteristic of the voice.

6. The method of claim 5, wherein the characteristic of the voice is at least one of pitch, tone, intonation, volume, speaking pace, word selection, language structure, language, expression of emotion, mood, or topic discussed.

7. The method of claim 2, wherein the sound-based trigger includes detection of a name or a greeting.

8. The method of claim 1, wherein the sound-based trigger includes a person-generated sound.

9. The method of claim 8, wherein the sound-based trigger includes at least one of a laugh, applause, a gasp, a cheer, or singing.

10. The method of claim 1, wherein the sound-based trigger indicative of activity of the user or another person near the user is a sound-based trigger that is independent of a gesture made by the user or the another person near the user.

11. A camera that is configured to capture digital image data the digital image data including at least one of a digital image or a video, comprising:
    a control circuit configured to
       capture digital image data without user input that commands the capturing of the digital image data,
       detect a sound-based trigger in an audio signal output by a microphone present at the camera, the sound-based trigger indicative of activity of the user or another person near the user,
       determine at least one of a type of the sound-based trigger or an intensity of the sound-based trigger, wherein prior to capturing the digital image data a number of images to be captured or a determination to capture video instead of or in addition to the capture of one or more images is based on the determined type of the detected sound-based trigger or the determined intensity of the detected sound-based trigger;
    a camera module that captures the digital image data under the control of the control circuit in response to the detection of the sound-based trigger and at least one of the determined type of the sound-based trigger or the determined intensity of the sound-based trigger; and
    a memory in which the digital image is stored.

12. The camera of claim 11, wherein the sound-based trigger includes a voice of a person.

13. The camera of claim 12, wherein the sound-based trigger includes one of detection of a speaker after a predetermined period of time without speaking or detection of a new speaker when a conversation is already in progress.

14. The camera of claim 12, wherein the sound-based trigger includes detection of a change in a characteristic of the voice.

15. The camera of claim 14, wherein the characteristic of the voice is at least one of pitch, tone, intonation, volume, speaking pace, word selection, language structure, language, expression of emotion, mood, or topic discussed.

16. The camera of claim 12, wherein the sound-based trigger includes detection of a name or a greeting.

17. The camera of claim 11, wherein the sound-based trigger includes a person-generated sound in the form of at least one of a laugh, applause, a gasp, a cheer, or singing.

18. The camera of claim 11, wherein the camera further comprises the microphone.

19. The camera of claim 11, wherein the camera further comprises an interface with another electronic device separate from the camera and the microphone is part of the another electronic device.

20. A method of capturing and storing digital image data, the digital image data including at least one of a digital image or a video, the method comprising:
    using a camera that is configured to capture the digital image data without user input that commands the capturing of the digital image data;
    capturing the digital image data with a camera module of the camera, the capturing triggered by a time schedule for capturing images;
    analyzing an audio signal output by a microphone present at the camera for a sound-based trigger indicative of activity of the user or another person near the user and occurring within a predetermined amount of time before or within a predetermined amount of time after the capturing of the digital image data;

determining at least one of a type of the sound-based trigger or an intensity of the sound-based trigger; and storing the digital image data in an image store of a memory for later displaying or transfer to an electronic device separate from the camera if detection of the sound-based trigger is made, wherein prior to capturing the digital image data a number of images to be captured or a determination to capture video instead of or in addition to the capture of one or more images is based on the determined type of the detected sound-based trigger or the determined intensity of the detected sound-based trigger, else not retaining the digital image in the camera for later displaying or transfer to an electronic device separate from the camera.

\* \* \* \* \*